United States Patent
Thompson et al.

(10) Patent No.: US 9,394,433 B2
(45) Date of Patent: Jul. 19, 2016

(54) NANOSILICA CONTAINING POLYCYANATE ESTER COMPOSITIONS

(71) Applicant: 3M INNOVATIVE PROPERTIES COMPANY, St. Paul, MN (US)

(72) Inventors: Wendy L. Thompson, Roseville, MN (US); James M. Nelson, Woodbury, MN (US); William J. Schultz, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/358,514

(22) PCT Filed: Oct. 24, 2012

(86) PCT No.: PCT/US2012/061647
§ 371 (c)(1),
(2) Date: May 15, 2014

(87) PCT Pub. No.: WO2013/074259
PCT Pub. Date: May 23, 2013

(65) Prior Publication Data
US 2014/0316027 A1    Oct. 23, 2014

Related U.S. Application Data

(60) Provisional application No. 61/560,525, filed on Nov. 16, 2011.

(51) Int. Cl.
| | | |
|---|---|---|
| *C08K 3/22* | (2006.01) | |
| *C08K 9/06* | (2006.01) | |
| *C08J 5/24* | (2006.01) | |
| *C08K 9/04* | (2006.01) | |
| *C08J 5/00* | (2006.01) | |
| *C08J 5/10* | (2006.01) | |
| *C08L 79/04* | (2006.01) | |
| *B82Y 30/00* | (2011.01) | |

(52) U.S. Cl.
CPC . *C08K 9/06* (2013.01); *B82Y 30/00* (2013.01); *C08J 5/005* (2013.01); *C08J 5/10* (2013.01); *C08J 5/24* (2013.01); *C08K 9/04* (2013.01); *C08L 79/04* (2013.01); *C08J 2379/04* (2013.01)

(58) Field of Classification Search
CPC .......................................................... C08K 3/22
USPC ........................................ 523/223, 212, 216
See application file for complete search history.

(56) References Cited

U.S. PATENT DOCUMENTS

| | | |
|---|---|---|
| 2,801,185 A | 7/1957 | Iler |
| 3,018,262 A | 1/1962 | Schroeder |
| 3,298,998 A | 1/1967 | McConnell |
| 3,562,223 A | 2/1971 | Bargain |
| 3,627,780 A | 12/1971 | Bonnard |
| 3,839,358 A | 10/1974 | Bargain |
| 4,100,140 A | 7/1978 | Zahir |
| 4,157,360 A | 6/1979 | Prevorsek |
| 4,468,497 A | 8/1984 | Street |
| 4,522,958 A | 6/1985 | Das |
| 5,648,407 A | 7/1997 | Goetz |
| 5,985,963 A | 11/1999 | D'Sidocky |
| 2011/0021797 A1 | 1/2011 | Tiefenbruck |

FOREIGN PATENT DOCUMENTS

| | | |
|---|---|---|
| KR | 100791831 | 12/2007 |
| WO | WO 96-36665 | 11/1996 |
| WO | WO 2008-027979 | 3/2008 |
| WO | WO 2009-120868 | 10/2009 |
| WO | WO 2009-152301 | 12/2009 |
| WO | WO 2013-063057 | 5/2013 |

OTHER PUBLICATIONS

International Search Report for PCT International Application No. PCT/US2012/061647, mailed on Mar. 6, 2013, 3 pages.

*Primary Examiner* — Edward Cain
(74) *Attorney, Agent, or Firm* — Philip Y. Dahl; Philip P. Soo

(57) ABSTRACT

There are provided curable resin sols having a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin. There are also provided compositions comprising such curable resin sol and reinforcing fibers, a process for preparing such compositions, and various articles made using such curable resin sols and compositions.

18 Claims, 2 Drawing Sheets

NANOSILICA CONTAINING POLYCYANATE ESTER COMPOSITIONS

CROSS REFERENCE TO RELATED APPLICATIONS

This application is a national stage filing under 35 U.S.C. 371 of PCT/US2012/061647 filed Oct. 24, 2012, which claims priority to U.S. Provisional Patent Application No. 61/560,525, filed Nov. 16, 2011, the disclosures of which are incorporated by reference in their entirety herein.

FIELD

This disclosure relates to compositions comprising curable resin, to fiber-reinforced composites derived therefrom, and to methods of improving the mechanical properties of fiber-reinforced composites.

BACKGROUND

Advanced structural composites are high modulus, high strength materials useful in many applications requiring high strength to weight ratios, e.g., applications in the automotive, sporting goods, and aerospace industries. Such composites typically comprise reinforcing fibers (e.g., carbon or glass) embedded in a cured resin matrix.

A number of the deficiencies of advanced composites result from limitations of the matrix resins used in the fabrication of the composites. Resin-dependent properties include composite compression strength and shear modulus (which are dependent on the resin modulus) and impact strength (which is dependent on the resin fracture toughness). Various methods of improving these resin-dependent composite properties have been attempted. For example, elastomeric fillers (such as carboxyl-, amino-, or sulfhydryl-terminated poly-acrylonitrile-butadiene elastomers) have been incorporated, thermoplastics (such as polyether imides or polysulfones) have been incorporated, and the crosslink density of the matrix resin has been decreased by using monomers of higher molecular weight or lower functionality. Such methods have indeed been effective at increasing resin fracture toughness and composite impact strength. But, unfortunately, the methods have also produced a decrease in the resin modulus and, accordingly, a decrease in the compression strength and shear modulus of composites made from the resins. (And the methods have tended to degrade the high temperature properties of the composites, as well.) Thus, composites prepared by these methods have had to be thicker and therefore heavier in order to exhibit the compressive and shear properties needed for various applications.

Other methods have focused on increasing the modulus of matrix resins as a means of increasing composite compressive and shear properties. For example, "fortifiers" or antiplasticizers have been utilized. Such materials do increase the modulus of cured epoxy networks but also significantly reduce glass transition temperature and increase moisture absorption. Thus, the materials are unsatisfactory for use in high performance composite matrix resins.

Conventional fillers (fillers having a particle size greater than one micron) can also be used to increase the modulus of cured thermosetting resin networks, but such fillers are unsuitable for use in the fabrication of advanced composites for the following reasons. During the curing of a fiber-containing composite composition, resin flow sufficient to rid the composition of trapped air (and thereby enable the production of a composite which is free of voids) is required. As the resin flows, finer denier fibers can act as filter media and separate the conventional filler particles from the resin, resulting in a heterogeneous distribution of filler and cured resin which is unacceptable. Conventional fillers also frequently scratch the surface of the fibers, thereby reducing fiber strength. This can severely reduce the strength of the resulting composite.

Amorphous silica microfibers or whiskers have also been added to thermosetting matrix resins to improve the impact resistance and modulus of composites derived therefrom. However, the high aspect ratio of such microfibers can result in an unacceptable increase in resin viscosity, making processing difficult and also limiting the amount of microfiber that can be added to the matrix resin.

Use of nanoparticles as fillers in resins has been broadly disclosed. However, most of these disclosures have focused on maintaining viscosities of the unfilled resins. In some cases, the unfilled viscosities of the resins are too low for processing with conventional equipment.

Accordingly, there is a need for methods of producing matrix resin systems that are high in both fracture toughness and modulus, and which therefore provide composites exhibiting high toughness as well as high compressive and shear properties. Such methods should also provide an increase in viscosity and easy processability of conventional resin systems. Additionally, improvements in the preparation of such materials are desired. Further, industrial efforts are focused on reducing cure temperatures and thus enable lower temperature out of autoclave processing methods where structures are exposed to lower thermal stress.

SUMMARY

Curable polycyanate ester resin sols that upon cure result in composite materials exhibiting high toughness as well as high compressive and shear properties are provided. Surprisingly, it has been found that curable polycyanate ester sols having no greater than 200 parts per million by weight alkali metal and alkaline earth metal ions based on the total weight of the silica nanoparticles and curable polycyanate ester resin result in advantageous processing properties when compared to curable polycyanate ester sols having greater than 200 parts per million by weight alkali metal and alkaline earth metal ions based on the total weight of the silica nanoparticles and curable polycyanate ester resin. Unexpectedly, it was observed that, when curable polycyanate ester sols having no greater than 200 parts per million by weight alkali metal and alkaline earth metal ions based on the total weight of the silica nanoparticles and curable polycyanate ester resin sols were employed the onset and peak cure temperatures were not as low as the resin sols having greater than 200 parts per million by weight alkali metal and alkaline earth metal ions based on the total weight of the silica nanoparticles and curable polycyanate ester resin. The overall result is that the presently disclosed curable polycyanate ester resin sols can be prepared using conventional processes. For example, silica can be added to the presently disclosed curable polycyanate ester resin sols without catalyzing early onset curing of the curable polycyanate ester resin.

When comparing the presently disclosed curable polycyanate ester resin sols to the neat resin, the presently disclosed curable polycyanate ester resin sols have lower peak cure temperatures. This is desirable because these lower peak cure temperatures increase the range of composite fabrication processes that can be employed, such as out-of-autoclave options, for cured compositions and articles derived from the presently disclosed curable polycyanate ester resin sols.

Lower cure peak temperatures may also influence resulting part quality providing lower thermal expansion and less thermal stress.

In one aspect, the present disclosure provides a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin. In some embodiments, the sol contains less than about 2 weight percent of volatile materials. In some embodiments, the nanosilica particles have an average particle diameter in the range of from about 50 nanometers to about 1000 nanometers. In some embodiments, the nanosilica particles have an average particle diameter in the range of about 60 nanometers to about 200 nanometers.

In some embodiments, the curable polycyanate resin comprises at least one additional curable resin selected from at least one of epoxy resins, vinyl ester resins, acrylic resins, bisbenzocyclobutane resins, and bisimide resins. In some embodiments, the sol comprises no greater than 100 parts per million by weight alkali metal and alkaline earth metal ions based on the total weight of the silica nanoparticles and curable polycyanate ester resin. In some embodiments, the surface-modified silica nanoparticles comprise dual-ion exchanged, surface-modified silica nanoparticles.

In another aspect, the present disclosure provides a composition comprising (a) a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; and (b) reinforcing fibers. In some embodiments, the composition contains less than about 2 weight percent of volatile materials. In some embodiments, the nanosilica particles have an average particle diameter in the range of from about 50 nanometer to about 1000 nanometers. In some embodiments, the nanosilica particles have an average particle diameter in the range of about 60 nanometers to about 200 nanometers.

In some embodiments, the curable polycyanate ester resin comprises at least one additional curable resin selected from at least one of epoxy resins, vinyl ester resins, acrylic resins, bisbenzocyclobutane resins, and bisimide resins. In some embodiments, the surface-bonded organic groups are organosilanes. In some embodiments, the reinforcing fibers are continuous. In some embodiments, the reinforcing fibers comprise carbon, glass, ceramic, boron, silicon carbide, polyimide, polyamide, polyethylene, or combinations thereof. In some embodiments, the reinforcing fibers comprise a unidirectional array of individual continuous fibers, woven fabric, knitted fabric, yarn, roving, braided constructions, or nonwoven mat.

In some embodiments, the curable polycyanate ester resin content is less than or equal to 25 volume percent based on the total weight of the composition when the reinforcing fibers comprise 61 volume percent. In some embodiments, the curable polycyanate ester resin content is less than or equal to 35 volume percent based on the total weight of the composition when the reinforcing fibers comprise 50 volume percent.

In some embodiments, the composition includes at least one additive selected from the group consisting of curing agents, cure accelerators, catalysts, crosslinking agents, dyes, flame retardants, pigments, impact modifiers, and flow control agents. In some embodiments, the composition comprises no greater than 100 parts per million by weight alkali metal and alkaline earth metal ions based on the total weight of the silica nanoparticles and curable polycyanate ester resin.

In some embodiments, the surface-modified silica nanoparticles comprise dual-ion exchanged, surface-modified silica nanoparticles.

In one aspect, the present disclosure provides a prepreg comprising any of the aforementioned compositions. In another aspect, the present disclosure provides a composite comprising a cured version of any of the aforementioned compositions. In some embodiments, the nanosilica particles are uniformly distributed throughout the cured composition.

In another aspect, there is provided a thick article comprising: a cured composition comprising (a) a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; and (b) reinforcing fibers. In some embodiments, the nanosilica particles are uniformly distributed throughout the cured composition.

In another aspect, there is provided a process for preparing fiber-containing compositions comprising the steps of (a) forming a mixture comprising a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; (b) removing said volatile liquid from said mixture so as to form a curable resin sol; and (c) combining said mixture or said curable resin sol with reinforcing fibers so as to form an essentially volatile-free fiber-containing composition. In some embodiments, there is an additional step of curing said fiber-containing composition. In some embodiments, the combining is carried out according to a process selected from the group consisting of resin transfer molding, pultrusion, and filament winding. In some embodiments, a prepreg is prepared by the aforementioned process. In some embodiments, there is provided a composite prepared by the aforementioned process. In some embodiments, there is provided an article comprising any of the aforementioned composites.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
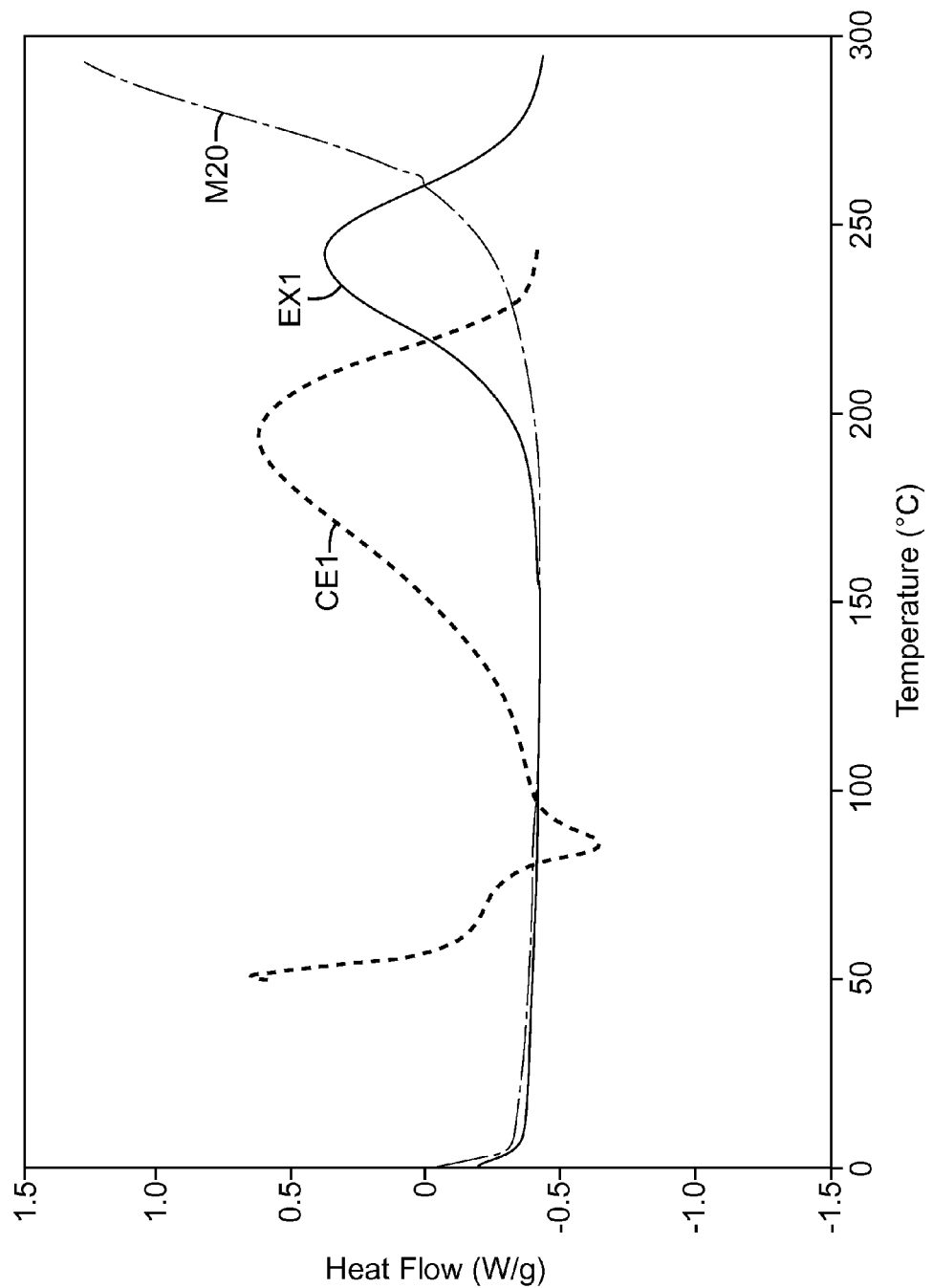
FIG. 1 is a graphical representation of the curing profiles of Example 1 (EX1), Comparative Example 1 (CE1) and a commercially available polycyanate ester resin containing no nanosilica particles.

Curable resins suitable for use in the compositions of the invention are those resins, e.g., thermosetting resins and radiation-curable resins, which are capable of being cured to form a glassy network polymer. Suitable resins include, e.g., epoxy resins, curable imide resins (especially maleimide resins, but also including, e.g., commercial K-3 polyimides (available from duPont) and polyimides having a terminal reactive group such as acetylene, diacetylene, phenylethynyl, norbornene, nadimide, or benzocyclobutane), vinyl ester resins and acrylic resins (e.g., (meth)acrylic esters or amides of polyols, epoxies, and amines), bisbenzocyclobutane resins, polycyanate ester resins, and mixtures thereof. The resins can be utilized in the form of either monomers or prepolymers. In some embodiments, curable resins include curable polycyanate ester resins. These curable polycyanate ester resins may be blended with other curable resins, such as epoxy resins, maleimide resins, bismide resins, and mixtures thereof.

Polycyanate ester resins suitable for use in the presently disclosed blend compositions can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri- and higher functionality cyanate resins are also suitable.

Curable bisimide resins useful in the present disclosure include maleimide resins. Maleimide resins suitable for use in the compositions of the present disclosure include bismaleimides, polymaleimides, and polyaminobismaleimides. Such maleimides can be conveniently synthesized by combining maleic anhydride or substituted maleic anhydrides with di- or polyamine(s). In some embodiments, useful bisimides are N,N'-bismaleimides, which can be prepared, e.g., by the methods described in U.S. Pat. No. 3,562,223 (Bargain et al.), U.S. Pat. No. 3,627,780 (Bonnard et al.), U.S. Pat. No. 3,839,358 (Bargain), and U.S. Pat. No. 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Various bismaleimide compounds are disclosed in U.S. Pat. No. 5,985,963, the entire disclosure of which is incorporated herein by reference. Non-limiting examples of bismaleimides that may be used in the present disclosure include N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxy-dipropylene)bismaleimide, N,N'-(aminodipropylene)-bismaleimide, N,N'-(ethylenedioxydipropylene)-bismaleimide, N,N'(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene) bismaleimide, N,N'-(oxy-1,4-dicyclohexylene) bismaleimide, N,N'-(m-phenylene)bismaleimide, N,N'-p-(phenylene)-bismaleimide, N,N'-(o-phenylene) bismaleimide, N,N'-(1,3-naphthylene)bismaleimide, N,N'-(1,4-naphthylene)-bismaleimide, N,N'-(1,5-naphthylene) bismaleimide, N,N-(3,3'-dimethyl-4,4'-diphenylene)bismaleimide, N,N'-(3,3-dichloro-4,4'-biphenylene)bismaleimide, N,N'-(2,4-pyridyl)bismaleimide, N,N'-(2,6-pyridyl)-bismaleimide, N,N'-(m-tolylene)bismaleimide, N,N'-(p-tolylene) bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)-bismaleimide, N,N'-(5-hydroxy-1,3-phenylene)-bismaleimide, N,N'-(5-methoxy-1,3-phenylene)-bismaleimide, N,N'-(m-xylylene)bismaleimide, N,N'-(p-xylylene)bismaleimide, N,N'-(methylenedi-p-phenylene)-bismaleimide, N,N'-(isopropylidenedi-p-phenylene)-bismaleimide, N,N'-(oxydi-p-phenylene)bismaleimide, N,N'-(thiodi-p-phenylene)bismaleimide, N,N-(dithiodi-p-phenylene)bismaleimide, N,N'-(sulfodi-p-phenylene)-bismaleimide, N,N'-(carbonyldi-p-phenylene)-bismaleimide, α-bis-(4-maleimidophenyl)-meta-diisopropylbenzene, α-bis-(4-p-phenylene)bismaleimide, N,N'-m-xylylene-bis-citraconic imide and α-bis-(4-maleimidophenyl)-para-diisopropylbenzene. In one embodiment, the bismaleimide is N,N'-(m-phenylene)bismaleimide, available from DuPont under the trade designation "HVA".

Co-reactants for use with the bismaleimides can include any of a wide variety of unsaturated organic compounds, particularly those having multiple unsaturation, either ethylenic, acetylenic, or both. Examples include (meth)acrylic acid and (meth)acrylamide and derivatives thereof, e.g., (methyl)methacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; α-methyl styrene; chlorostyrene; p-phenylstyrene; p-methylstyrene; t-butylstyrene; and phenyl vinyl ether. Of particular interest are resin systems employing a bismaleimide in combination with a bis(alkenylphenol). Descriptions of a typical resin system of this type are found in U.S. Pat. No. 4,100,140 (Zahir et al.), the descriptions of which are incorporated herein by reference. In some embodiments, particularly useful components are 4,4'-bismaleimidodiphenylmethane and o,o'-diallyl bisphenol A.

Epoxy resins useful to blend with the presently disclosed bismaleimide resins are those epoxy resins well-known in the art, such as those that comprise compounds or mixtures of compounds which contain one or more epoxy groups of the structure:

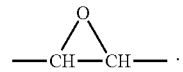

The compounds can be saturated or unsaturated, aliphatic, alicyclic, aromatic, or heterocyclic, or can comprise combinations thereof. Compounds which contain more than one epoxy group (i.e., polyepoxides) are useful in some embodiments.

Polyepoxides which can be utilized in the compositions of the invention include, e.g., both aliphatic and aromatic polyepoxides, but aromatic polyepoxides are useful for high temperature applications. The aromatic polyepoxides are compounds containing at least one aromatic ring structure, e.g. a benzene ring, and more than one epoxy group. In some embodiments, aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. In some embodiments, useful aromatic polyepoxides are the polyglycidyl ethers of polyhydric phenols.

Representative examples of aliphatic polyepoxides which can be utilized in the compositions of the invention include 3',4' epoxycyclohexylmethyl-3,4 epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis (3,4-epoxycyclohexylmethyl)adipate, the diglycidyl ester of linoleic dimer acid, 1,4-bis(2,3-epoxypropoxy)butane, 4-(1, 2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyldimethylmethane, and mixtures thereof.

Representative examples of aromatic polyepoxides which can be utilized in the compositions of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl] propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schoeder) and U.S. Pat. No. 3,298,998 (Coover et al.), the descriptions of which are incorporated herein by reference, as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. In some embodiments, a class of polyglycidyl ethers of polyhydric phenols useful in the presently disclosed compositions are the diglycidyl ethers of bisphenol that have pendant carbocyclic groups, e.g., those described in U.S. Pat. No. 3,298,998 (Coover et al.), the description of which is incorporated herein by reference. Examples of such compounds include 2,2-bis[4-(2,3-epoxypropoxy)phenyl]norcamphane and 2,2-bis[4-(2,3-epoxypropoxy)phenyl]decahydro-1,4,5,8-¬ dimethanonaphthalene. In some embodiments, 9,9-bis[4-(2,3-epoxypropoxy)phenyl]fluorene is used.

Suitable epoxy resins can be prepared by, e.g., the reaction of epichlorohydrin with a polyol, as described, e.g., in U.S. Pat. No. 4,522,958 (Das et al.), the description of which is incorporated herein by reference, as well as by other methods described by Lee and Neville and by May, supra. Many epoxy resins are also commercially available.

In some embodiments, the resin content useful in the present disclosure can vary depending on the type of reinforcing fibers used in the composition. For example, the resin content useful in the present disclosure includes a curable resin content of less than or equal to 35 wt % based on the total weight of the composition when the reinforcing fibers comprise carbon. In some embodiments, the resin content useful in the present disclosure includes a curable polycyanate ester resin content of less than or equal to 25 wt % based on the total weight of the composition when the reinforcing fibers comprise glass. In some embodiments, the curable bisimide resin content is less than or equal to 32 volume percent based on the total weight of the composition when the reinforcing fibers comprise 61 volume percent. In some embodiments, the curable bisimide resin content is less than or equal to 41 volume percent based on the total weight of the composition when the reinforcing fibers comprise 50 volume percent.

Nanoparticles suitable for use in the presently disclosed compositions and articles are substantially spherical in shape, colloidal in size (e.g., having an average particle diameter in the range of from about 1 nanometer to about 1 micrometer), and substantially inorganic in chemical composition. Colloidal silica is useful, but other colloidal metal oxides, e.g., colloidal titania, colloidal alumina, colloidal zirconia, colloidal vanadia, colloidal chromia, colloidal iron oxide, colloidal antimony oxide, colloidal tin oxide, and mixtures thereof, can also be utilized. The colloidal nanoparticles can comprise essentially a single oxide such as silica or can comprise a core of an oxide of one type (or a core of a material other than a metal oxide) on which is deposited an oxide of another type. Generally, the nanoparticles can range in size (average particle diameter) from about 50 nanometers to about 1000 nanometers, preferably from about 60 nanometers to about 200 nanometers.

It is also useful for the colloidal nanoparticles to be relatively uniform in size and remain substantially non-aggregated, as nanoparticle aggregation can result in precipitation, gellation, or a dramatic increase in sol viscosity. Thus, a particularly desirable class of nanoparticles for use in preparing the compositions of the invention includes sols of inorganic nanoparticles (e.g., colloidal dispersions of inorganic nanosilica particles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., the descriptions of the techniques and forms given in U.S. Pat. No. 2,801,185 (Iler) and U.S. Pat. No. 4,522,958 (Das et al.), which descriptions are incorporated herein by reference, as well as those given by R. K. Iler in The Chemistry of Silica, John Wiley & Sons, New York (1979).

Due to their surface chemistry and commercial availability, silica hydrosols are useful for preparing the compositions of the invention. Such hydrosols are available in a variety of particle sizes and concentrations from, e.g., Nyacol Products, Inc. in Ashland, Md.; Nalco Chemical Company in Oakbrook, Ill.; and E.I. duPont de Nemours and Company in Wilmington, Del. Concentrations of from about 10 to about 50 percent by weight of silica in water are generally useful, with concentrations of from about 23 to about 56 volume percent (30 to about 50 weight percent) being useful in some embodiments (as there is less water to be removed). If desired, silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols, e.g., electrodialysis, ion exchange of sodium silicate, hydrolysis of silicon compounds, and dissolution of elemental silicon are described by Iler, supra. In some embodiments, a useful method of preparing the presently disclosed nanosilica particles includes ion exchanging the particles before including them in the curable resin sol.

It is desirable for the presently disclosed curable resin sols to have a relatively low content of alkali metal and alkaline earth metal ions based on the total weight of the silica nanoparticles and curable polycyanate ester resin. In some embodiments, it is useful for the curable resin sol to include 200 parts per million or less by weight alkali metal and alkaline earth metal ions based on the total weight of the silica nanoparticles and curable polycyanate ester resin. In some embodiments, it is useful for the curable resin sol to include 100 parts per million or less by weight alkali metal and alkaline earth metal ions based on the total weight of the silica nanoparticles and curable polycyanate ester resin. These low levels of alkali metal and alkaline earth metal ions in the curable resin sol can be achieved by various processing techniques. For example, in some embodiments, the nanosilica particles are subjected to anion exchange followed by cation exchange (i.e., "dual-ion-exchange"). Without wishing to be bound by theory, it is believed that curable resin sols that do not have a relatively low content of alkali metal and alkaline earth metal ions (such as by not using nanosilica particles that were ion exchanged before use in the curable resin sol) will exhibit an earlier onset cure temperature. Curable resin sols having a relatively low content of alkali metal and alkaline earth metal ions have little or no effect on the cure characteristics of curable compositions derived therefrom. This is important when using a curable polycyanate ester resin because early onset curing temperatures can create a host of processing issues, such as gelation occurring during the devolatilzation step. Thus, it is desirable to have some control over onset curing temperatures and timing of curing to take advantage of the benefits of lower temperature curing while avoiding gelation during devolatilzation.

In preparing the presently disclosed compositions, a curable resin sol can generally be prepared first and then combined with reinforcing fibers. Preparation of the curable resin sol generally requires that at least a portion of the surface of the inorganic nanosilica particles be modified so as to aid in the dispersibility of the nanosilica particles in the resin. This surface modification can be effected by various different methods which are known in the art. (See, e.g., the surface modification techniques described in U.S. Pat. No. 2,801,185 (Iler) and U.S. Pat. No. 4,522,958 (Das et al.), which descriptions are incorporated herein by reference.)

For example, silica nanoparticles can be treated with monohydric alcohols, polyols, or mixtures thereof (preferably, a saturated primary alcohol) under conditions such that silanol groups on the surface of the particles chemically bond with hydroxyl groups to produce surface-bonded ester groups. The surface of silica (or other metal oxide) particles can also be treated with organosilanes, e.g, alkyl chlorosilanes, trialkoxy arylsilanes, or trialkoxy alkylsilanes, or with other chemical compounds, e.g., organotitanates, which are capable of attaching to the surface of the particles by a chemical bond (covalent or ionic) or by a strong physical bond, and which are chemically compatible with the chosen resin(s). In some embodiments, treatment with organosilanes is useful. When aromatic ring-containing epoxy resins are utilized, surface treatment agents which also contain at least one aromatic ring are generally compatible with the resin.

In preparing the curable resin sols, a hydrosol (e.g., a silica hydrosol) can generally be combined with a water-miscible organic liquid (e.g., an alcohol, ether, amide, ketone, or nitrile) and, optionally (if alcohol is used as the organic liquid), a surface treatment agent such as an organosilane or organotitanate. Alcohol and/or the surface treatment agent can generally be used in an amount such that at least a portion of the surface of the nanoparticles is modified sufficiently to enable the formation of a stable curable resin sol (upon combination with curable resin, infra). Preferably, the amount of alcohol and/or treatment agent is selected so as to provide particles which are at least about 50 weight percent metal oxide (e.g., silica), more preferably, at least about 75 weight percent metal oxide. (Alcohol can be added in an amount sufficient for the alcohol to serve as both diluent and treatment agent.) The resulting mixture can then be heated to remove water by distillation or by azeotropic distillation and can then be maintained at a temperature of, e.g., about 100° C. for a period of, e.g., about 24 hours to enable the reaction (or other interaction) of the alcohol and/or other surface treatment agent with chemical groups on the surface of the nanoparticles. This provides an organosol comprising nanoparticles which have surface-attached or surface-bonded organic groups ("substantially inorganic" nanoparticles).

The resulting organosol can then be combined with a curable resin and the organic liquid removed by, e.g., using a rotary evaporator. (The removal of the organic liquid can, alternatively, be delayed until after combination with reinforcing fibers, if desired.) Preferably, the organic liquid is removed by heating under vacuum to a temperature sufficient to remove even tightly-bound volatile components. Stripping times and temperatures can generally be selected so as to maximize removal of volatiles while minimizing advancement of the resin. Failure to adequately remove volatiles at this stage leads to void formation during the curing of the composition, resulting in deterioration of thermomechanical properties in the cured composites. (This is a particularly severe problem in the fabrication of structural composites, where the presence of voids can have a disastrous effect on physical properties.) Unremoved volatiles can also plasticize the cured resin network and thereby degrade its high temperature properties. Generally, resin sols having volatile levels less than about 2 weight percent (preferably, less than about 1.5 weight percent) provide void-free composites having the desired thermomechanical properties.

Removal of volatiles can result in gel formation (due to loss of any surface-bound volatiles), if the above-described surface treatment agent is not properly chosen so as to be compatible with the curable resin, if the agent is not tightly-bound to the microparticle surface, and/or if an incorrect amount of agent is used. As to compatibility, the treated particle and the resin should generally have a positive enthalpy of mixing to ensure the formation of a stable sol. (Solubility parameter can often be conveniently used to accomplish this by matching the solubility parameter of the surface treatment agent with that of the curable resin.) Removal of the volatiles provides curable resin sols, which can generally contain from about 3 to about 50 volume percent (preferably, from about 4 to about 30 volume percent) substantially inorganic nanoparticles.

The presently disclosed compositions can be prepared by combining the curable resin sol with reinforcing fibers (preferably, continuous reinforcing fibers). Suitable fibers include both organic and inorganic fibers, e.g., carbon or graphite fibers, glass fibers, ceramic fibers, boron fibers, silicon carbide fibers, polyimide fibers, polyamide fibers, polyethylene fibers, and the like, and combinations thereof. Fibers of carbon, glass, or polyamide are useful due to considerations of cost, physical properties, and processability. Such fibers can be in the form of a unidirectional array of individual continuous fibers, woven fabric, knitted fabric, yarn, roving, braided constructions, or non-woven mat. Generally, the compositions can contain, e.g., from about 30 to about 80 (preferably, from about 45 to about 70) volume percent fibers, depending upon structural application requirements.

The compositions can further comprise additives such as curing agents, cure accelerators, catalysts, crosslinking agents, dyes, flame retardants, pigments, impact modifiers (e.g., rubbers or thermoplastics), and flow control agents. Epoxy resins can be cured by a variety of curing agents, some of which are described (along with a method for calculating the amounts to be used) by Lee and Neville in Handbook of Epoxy Resins, McGraw-Hill, pages 36-140, New York (1967). Useful epoxy resin curing agents include polyamines such as ethylenediamine, diethylenetriamine, aminoethylethanolamine, and the like, diaminodiphenylsulfone, 9,9-bis (4-aminophenyl)fluorene, 9,9-bis(3-chloro-4-(aminophenyl) fluorene, amides such as dicyandiamide, polycarboxylic acids such as adipic acid, acid anhydrides such as phthalic anhydride and chlorendic anhydride, and polyphenols such as bisphenol A, and the like. Generally, the epoxy resin and curing agent are used in stoichiometric amounts, but the curing agent can be used in amounts ranging from about 0.1 to 1.7 times the stoichiometric amount of epoxy resin.

Thermally-activated catalytic agents, e.g., Lewis acids and bases, tertiary amines, imidazoles, complexed Lewis acids, and organometallic compounds and salts, can also be utilized in curing epoxy resins. Thermally-activated catalysts can generally be used in amounts ranging from about 0.05 to about 5 percent by weight, based on the amount of curable bisimide resin present in the curable resin composition.

N,N'-bismaleimide resins can be cured using diamine curing agents, such as those described in U.S. Pat. No. 3,562,223 (Bargain et al.), the description of which is incorporated herein by reference. Generally, from about 0.2 to about 0.8 moles of diamine can be used per mole of N,N'-bismaleimide. N,N'-bismaleimides can also cure by other mechanisms, e.g., co-cure with aromatic olefins (such as bis-allylphenyl ether, 4,4'-bis(o-propenylphenoxy)benzophenone, or o,o'-diallyl bisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

The curable resin sols of the compositions of the present disclosure can be used to make composite articles by a variety of conventional processes, e.g., resin transfer molding, filament winding, tow placement, resin infusion processes, or traditional prepreg processes. Prepregs can be prepared by impregnating an array of fibers (or a fabric) with the resin sol (or with a volatile organic liquid-containing resin sol) and then layering the impregnated tape or fabric. The resulting prepreg can then be cured by application of heat, along with the application of pressure or vacuum (or both) to remove any trapped air.

The curable resin sols can also be used to make composite parts by a resin transfer molding process, which is widely used to prepare composite parts for the aerospace and automotive industries. In this process, fibers are first shaped into a preform which is then compressed to final part shape in a metal mold. The sol can then be pumped into the mold and heat-cured. Both a consistent resin viscosity and a small particle size (less than 1 micron in average diameter) are important for this process so that the sol can flow through the compressed preform in a short amount of time, without particle separation or preform distortion.

Composites can also be prepared from the curable resin sols by a filament winding process, which is typically used to prepare cylinders or other composites having a circular or oval cross-sectional shape. In this process, a fiber tow or an array of tows is impregnated with the sol by running it through a resin bath and immediately winding the impregnated tow onto a mandrel. The resulting composite can then be heat-cured.

A pultrusion process (a continuous process used to prepare constant cross-section parts) can also be used to make composites from the curable resin sols. In such a process, a large array of continuous fibers is first wetted out in a resin bath. The resulting wet array is then pulled through a heated die, where trapped air is squeezed out and the resin is cured.

The compositions of the present disclosure have sufficient viscosity that they are readily processable, e.g., by hot-melt techniques. The rheological and curing characteristics of the compositions can be adjusted to match those required for a particular composite manufacturing process. The compositions can be cured by application of heat, electron beam radiation, microwave radiation, or ultraviolet radiation to form fiber-reinforced composites which exhibit improved compression strength and/or shear modulus and improved impact behavior (relative to the corresponding cured compositions without nanoparticles). This makes the composites well-suited for use in applications requiring structural integrity, e.g., applications in the transportation, construction, and sporting goods industries. Some exemplary applications in which the presently disclosed composites are useful include tooling, molding, high capacity conductors, polymer composite conductors, electrical transmission lines, and the like.

In some embodiments, it is desirable to use the presently disclosed curable resin sols and compositions to make cured thick articles (or composites). As used herein the term "thick" means greater than 5 cm, in some embodiments greater than 10 cm, in some embodiments greater than 15 cm. Exemplary thick articles include tooling molds made using the presently disclosed curable resin sols and compositions.

For presently disclosed cured compositions (i.e. composites), including the presently disclosed thick articles, it is desirable for the nanosilica particles to be uniformly distributed throughout the cured composition. The term "uniformly distributed" as used herein means that the nanosilica particle distribution within any given 3 dimensional cross section of the cured compositions does not show evidence of particle agglomeration. Rather, it is desirable for the nanosilica particles to be evenly spaced throughout such a 3 dimensional cross section of the cured compositions.

Objects and advantages of this invention are further illustrated by the following examples, but the particular materials and amounts thereof recited in these examples, as well as other conditions and details, should not be construed to unduly limit this invention. In the examples, all temperatures are in degrees Centigrade and all parts and percentages are by weight unless indicated otherwise.

1. A curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin.

2. The sol of any of claim 1 wherein said sol contains less than about 2 weight percent of volatile materials.

3. The sol of any of the preceding claims wherein said nanosilica particles have an average particle diameter in the range of from about 50 nanometers to about 1000 nanometers.

4. The sol of any of the preceding claims wherein said nanosilica particles have an average particle diameter in the range of about 60 nanometers to about 200 nanometers.

5. The sol of any of the preceding claims wherein the curable polycyanate resin comprises at least one additional curable resin selected from at least one of epoxy resins, vinyl ester resins, acrylic resins, bisbenzocyclobutane resins, and bisimide resins.

6. The sol of any of the preceding claims wherein the sol comprises no greater than 100 parts per million by weight alkali metal and alkaline earth metal ions based on the total weight of the silica nanoparticles and curable polycyanate ester resin.

7. The sol of any of the preceding claims wherein the surface-modified silica nanoparticles comprise dual-ion exchanged, surface-modified silica nanoparticles.

8. A composition comprising (a) a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; and (b) reinforcing fibers.

9. The composition of claim 8 wherein said composition contains less than about 2 weight percent of volatile materials.

10. The composition of any of claims 8 to 9 wherein said nanosilica particles have an average particle diameter in the range of from about 50 nanometer to about 1000 nanometers.

11. The composition of any of claims 8 to 10 wherein said nanosilica particles have an average particle diameter in the range of about 60 nanometers to about 200 nanometers.

12. The composition of any of claims 8 to 11 wherein the curable polycyanate ester resin comprises at least one additional curable resin selected from at least one of epoxy resins, vinyl ester resins, acrylic resins, bisbenzocyclobutane resins, and bisimide resins.

13. The composition of any of claims 8 to 12 wherein said surface-bonded organic groups are organosilanes.

14. The composition of any of claims 8 to 13 wherein said reinforcing fibers are continuous.

15. The composition of any of claims 8 to 14 wherein said reinforcing fibers comprise carbon, glass, ceramic, boron, silicon carbide, polyimide, polyamide, polyethylene, or combinations thereof.

16. The composition of any of claims 8 to 14 wherein said reinforcing fibers comprise a unidirectional array of individual continuous fibers, woven fabric, knitted fabric, yarn, roving, braided constructions, or non-woven mat.

17. The composition of claim 14 wherein the curable polycyanate ester resin content is less than or equal to 25 volume percent based on the total weight of the composition when the reinforcing fibers comprise 61 volume percent.

18. The composition of claim 14 wherein the curable polycyanate ester resin content is less than or equal to 35 volume percent based on the total weight of the composition when the reinforcing fibers comprise 50 volume percent.

19. The composition of any of claims 8 to 18 further comprising at least one additive selected from the group consisting of curing agents, cure accelerators, catalysts, crosslinking agents, dyes, flame retardants, pigments, impact modifiers, and flow control agents.

20. The composition of any of claims 8 to 18 wherein the composition comprises no greater than 100 parts per million by weight alkali metal and alkaline earth metal ions based on the total weight of the silica nanoparticles and curable polycyanate ester resin.

21. The composition of any of claims 8 to 18 wherein the surface-modified silica nanoparticles comprise dual-ion exchanged, surface-modified silica nanoparticles.

22. A prepreg comprising the composition of any of claims 8 to 21.

23. A composite comprising the cured composition of any of claims 8 to 22.

24. The composite of claim 23 wherein the nanosilica particles are uniformly distributed throughout the cured composition.

25. A thick article comprising: a cured composition comprising (a) a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; and (b) reinforcing fibers.

26. The thick article of claim 25 wherein the nanosilica particles are uniformly distributed throughout the cured composition.

27. A process for preparing fiber-containing compositions comprising the steps of (a) forming a mixture comprising a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; (b) removing said volatile liquid from said mixture so as to form a curable resin sol; and (c) combining said mixture or said curable resin sol with reinforcing fibers so as to form an essentially volatile-free fiber-containing composition.

28. The process of claim 27 further comprising the step of curing said fiber-containing composition.

29. The process of claim 28 wherein said combining is carried out according to a process selected from the group consisting of resin transfer molding, pultrusion, and filament winding.

30. A prepreg prepared by the process of claim 27.

31. A composite prepared by the process of claim 27.

32. An article comprising the composite of claim 31.

Various modifications and alterations of this invention will become apparent to those skilled in the art without departing from the scope and spirit of this invention.

Test Methods

Rheological Dynamic Analyses (RDA)

Rheological dynamic analyses of uncured resins were run on an ARES rheometer (TA Instruments, New Castle, Del.) in parallel plate dynamic mode using top and bottom plates having a diameter of 50 mm, a gap setting of 1 mm, a temperature range of 50 to 180° C., a heating rate of 2° C./min., a frequency of 1 Hz, and a strain of 2%. Auto strain was used.

Differential Scanning Calorimetry (DSC)

The cure exotherm of the uncured resins was measured according to ASTM D 3418-08 with the following modifications. A TA Q2000 differential scanning calorimeter (TA Instruments) was employed and the samples were prepared in sealed pans and heated in air from −30° C. to 330° C. at 10° C./min. This temperature range is smaller than the temperature range specified in ASTM D 3418-08.

Thermogravimetric Analysis (TGA)

The silica content of a cured resin of CE1, EX1, EX 2, EX3 and EX4 was measured using a TA Instruments TGA 500 thermogravimetric analyzer (TA Instruments) and heating a 5 to 10 mg sample in air from 30° C. to 850° C. at 20° C./min. The noncombustible residue was taken to be the original nanosilica content of the resin.

| Materials | |
|---|---|
| BA-200 | Prepolymer bisphenol A dicyanate oligomer commercially available under the trade designation "Primaset BA-200" from Lonza, Basel, Switzerland. |
| BA-3000 | Toughened dicyanate oligomer commercially available under the trade designation "Primaset BA-3000" from by Lonza, Basel, Switzerland. |
| M-20 | A cyanate ester resin having a Mooney viscosity of 20 commercially available under the trade designation "ArcoCy M-20" from BASF Schweiz AG (formerly Ciba), Basel, Switzerland. |
| MIBK | Methyl isobutyl ketone available from Aldrich Chemicals, Milwaukee, WI. |
| Amberlite IR120(H) | Ion exchange resin available from Aldrich Chemicals, Milwaukee, WI. |
| MpOH | 1-methoxy-2-propanol, available from Aldrich Chemicals, Milwaukee, WI. |
| MP 2040 | 175 nm aqueous silica sol commercially available from Nissan Chemical. |
| Organosol 1 (OS 1) | A solution of phenyltrimethoxysilane/modified Nissan MP 2040. Phenyltrimethoxysilane modification was performed according to methods outlined in pending US Pat. Publ. No. US 2011/0021797 A1. |
| Organosol 2 (OS 2) | A solution of phenyltrimethoxysilane/modified Nissan MP 2040 in methoxypropanol/water (50/50 weight ratio). Ion exchange was performed according to procedures described in WO 2009152301. Phenyltrimethoxysilane modification was performed according to methods outlined in pending US patent application US 20110021797. |

Wiped Film Evaporator ("WFE")

Experiments were conducted using a 1 m² counter current polymer processing machine commercially available under the trade designation "Filmtruder" from Buss-SMS-Canzler, Prattleln, Switzerland, that was equipped with a with a 25 hp drive. Steam heat was applied and vapors were condensed using a 2.9 m² stainless steel condenser, designed for low-pressure drop, with an integral jacket and level tank, rated for full vacuum and −38° C. Product flow to the WFE was controlled by a BP-6 Series High Flow Back Pressure Regulator (GO Regulator, Spartanburg, S.C.). The bottom of the WFE was equipped with a 45/45 jacketed polymer pump and drive commercially available under the trade designation "Vacorex" from Maag Automatik, Incorporated, Charlotte, N.C. Vacuum was applied to the system by means of a KDH-130-B vacuum pump commercially available under the trade designation "Kinney" from Tuthill Vacuum and Blower Systems (Springfield, Mo.) and monitored using a Rosemount 3051 Pressure Transmitter (Rosemount, Incorporated, Chanhassen, Minn.). The WFE rotor design consisted of a material-lubricated bearing with an extended rotor apparatus which conveyed materials to the feed throat of the vacuum pump. The rotor extension was used to ensure proper removal of the devolitilized materials from the WFE. The distance from the pump gears to the bottom of the rotor extension bolt head is 5.84 cm.

Preparation of Nanoparticle Containing Precursor

Synthesis of Organosol 1 (OS1)

400 grams of Nissan MP 2040 (45% by weight aqueous silica), 600 grams of MpOH and 2.5 grams of phenyltrimethoxysilane was placed in a flask with stirrer, condenser and thermowatch and heated to 90-95° C. for 20 hours according to procedures outlined in U.S. Pat. No. 5,648,407 resulting in a sol with 23.1 wt % silica/silane solids. A portion of this solution was air dried for 12 hours resulting in 30 grams of solids that were combined with 350 grams of acetone and mixed at high speed using a shear mixer commercially available under the trade designation "Silverson" from Silverson Machines Limited, Waterside, UK (¾ speed for 1 minute). The resulting Organosol 1 was filtered through a 100 m nylon spectra mesh sheet and the silica/silane solids content, determined by drying small pan samples in a 100° C. oven, were found to be 9.2% wt %.

Synthesis of Organosol 2 (OS2)

A solution of phenyltrimethoxysilane/modified Nissan MP 2040 in methoxypropanol/water (50/50 weight ratio). Ion exchange was performed according to procedures described in WO 2009152301. Phenyltrimethoxysilane modification was performed according to methods outlined in pending US patent application US 20110021797.

Comparative Example (CE 1)

An OS1/M-20 suspension targeting 47 wt % silica content was prepared using the materials and amounts shown in Table 2, mixing the OS1 solution, and M-20 in a flask with agitation. The volatile components were removed using a Buchi roto-evaporator according to procedures outlined in U.S. Pat. No. 5,648,407 at 70° C. for about 30 minutes, followed by 80-85° C. for 30 minutes. Upon evaporation a sharp increase in resin viscosity was observed. Subsequently the silica solids in the M-20 were determined by TGA to be 47.8 wt %.

Example 1 (EX 1)

An OS2/M-20 suspension was prepared using the materials and amounts shown in Table 2. A 47 g quantity of air dried OS2 was combined with roughly 400 g of acetone and the resultant mixture was mixed at high speed using a shear mixer commercially available under the trade designation "Silverson" (¾ speed for 1 minute). The resulting solution was filtered through a 100μ nylon spectra mesh sheet and silica/silane solids content, determined by drying small pan samples in a 100° C. oven, was determined to be 11.0 wt %. A 250 g fraction of OS2 mixture was blended with 18 g of M-20 cyanate resin and processed according to procedures outlined in U.S. Pat. No. 5,648,407 at 80° C. for 15 minutes and at 120° C. for an additional 15 minutes. Subsequently the silica solids in the M-20 were determined by TGA to be 56.7 wt %.

Example 2-4 (EX2-EX4)

OS2/cyanate ester suspensions were prepared using the materials and amounts shown in Table 2, mixing the OS2 solution, cyanate ester, MIBK and MpOH in a 380 L kettle with agitation. The kettle was warmed to 60° C. and maintained at that temperature for 4 hrs. Materials were then cooled to room temperature in preparation for delivery to the wiped film evaporator (WFE). The suspension was metered to the top entrance of the WFE through use of a Zenith pump (100 cc Zenith BLB, Monroe, N.C.) and came in contact with the WFE rotor set at a speed of 340 RPM. Vacuum was applied at a level of 30 torr. The suspension was subjected to the temperature and feed conditions listed in Table 3. After 10 minutes, the product stream was collected in 5 gallon pails. The product was analyzed by thermogravimetric analysis and RDA as shown in Table 2.

TABLE 2

| Examples | OS1 (Kg) | OS2 (Kg) | % Si in sol | MIBK | Cyanate Ester Type (Kg) | Viscosity At 72° C. (Pa-S) | Wt % Silica Target (CE1) Actual (EX1-4) |
|---|---|---|---|---|---|---|---|
| CE1 | 0.181 | | 9.2 | — | M-20 (.015) | NA | 47 |
| EX1 | | 0.250 | 11.0 | — | M-20 (0.018) | 26.3 | 50 |
| EX2 | | 122 | 26.0 | 22.7 | BA-200 (31.8) | 10.2 | 51 |
| EX3 | | 213.5 | 17.2 | 27.3 | M-20 (36.4) | 13.2 | 50 |
| EX4 | | 89.5 | 26.0 | 20.5 | BA-3000 (23.3) | 248.7 | 51 |

TABLE 3

| Example | Sol Mixture Feed Rate (Kg/hr) | Product Output Rate (Kg/hr) | Distillate Rate (Kg/hr) | Temperature Profile (° C.) Zone 1 | Zone 2 | Zone 3 |
|---|---|---|---|---|---|---|
| EX2 | 62.5 | 22 | 40.5 | 105 | 150 | 115 |
| EX3 | 64 | 18 | 46 | 105 | 135 | 110 |
| EX4 | 64 | 22 | 42 | 105 | 150 | 115 |

Figure 2:
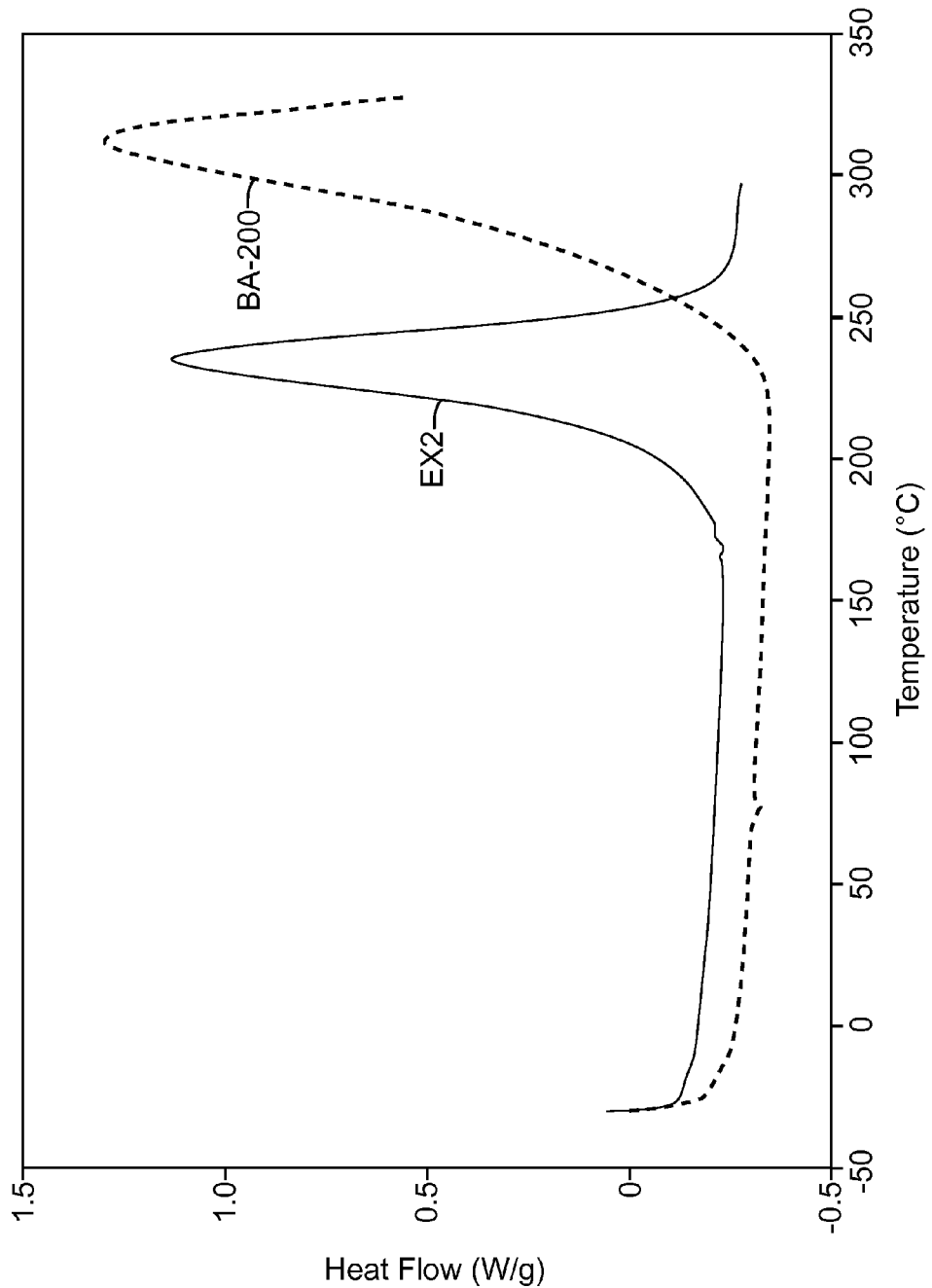
FIG. 2 is a graphical representation of the curing profiles of Example 2 (EX2) and a commercially available polycyanate ester resin containing no nanosilica particles.

DSC thermograms of CE1, EX1 and the cyanate ester M-20 are shown in FIG. 1. The presence of silica in CE1 and EX1 catalyzes the cure profile, especially when the starting sol is not ion exchanged. To demonstrate the broad applicability of this catalytic effect, DSC thermograms of BA-300 and EX2 are shown in FIG. 2. As previously mentioned the reduction of cure temperature is an advantageous improvement. The silica levels incorporated here are higher than those conventionally used.

What is claimed is:

1. A curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the surface-modified silica nanoparticles and curable polycyanate ester resin, wherein the surface-modified silica nanoparticles comprise dual-ion exchanged, surface-modified silica nanoparticles.

2. The sol of claim 1 wherein said sol contains less than about 2 weight percent of volatile materials.

3. The sol of claim 1 wherein said nanosilica particles have an average particle diameter in the range of about 60 nanometers to about 200 nanometers.

4. The sol of claim 1 wherein the curable polycyanate resin comprises at least one additional curable resin selected from at least one of epoxy resins, vinyl ester resins, acrylic resins, bisbenzocyclobutane resins, and bisimide resins.

5. The sol of claim 1 wherein the sol comprises no greater than 100 parts per million by weight alkali metal and alkaline earth metal ions based on the total weight of the silica nanoparticles and curable polycyanate ester resin.

6. A composition comprising (a) a curable resin sol comprising a curable polycyanate ester resin and at least 30 weight percent of an essentially volatile-free, colloidal dispersion of substantially spherical surface-modified silica nanoparticles; wherein the curable resin sol comprises no greater than 200 parts per million by weight alkali metal and alkaline earth metal ions based on the total weight of the silica nanoparticles and curable polycyanate ester resin; and (b) reinforcing fibers, wherein the surface-modified silica nanoparticles comprise dual-ion exchanged, surface-modified silica nanoparticles.

7. The composition of claim 6 wherein said composition contains less than about 2 weight percent of volatile materials.

8. The composition of claim 6 wherein said nanosilica particles have an average particle diameter in the range of from about 50 nanometer to about 1000 nanometers.

9. The composition of claim 6 wherein said nanosilica particles have an average particle diameter in the range of about 60 nanometers to about 200 nanometers.

10. The composition of claim 6 wherein the curable polycyanate ester resin comprises at least one additional curable resin selected from at least one of epoxy resins, vinyl ester resins, acrylic resins, bisbenzocyclobutane resins, and bisimide resins.

11. The composition of claim 6 comprising surface-bonded organic groups which are organosilanes.

12. The composition of claim 6 wherein said reinforcing fibers are continuous.

13. The composition of claim 6 herein said reinforcing fibers comprise carbon, glass, ceramic, boron, silicon carbide, polyimide, polyamide, polyethylene, or combinations thereof.

14. The composition of claim 6 wherein said reinforcing fibers comprise a unidirectional array of individual continuous fibers, woven fabric, knitted fabric, yarn, roving, braided constructions, or non-woven mat.

15. The composition of claim 12 wherein the curable polycyanate ester resin content is less than or equal to 25 volume percent based on the total weight of the composition when the reinforcing fibers comprise 61 volume percent.

16. The composition of claim 12 wherein the curable polycyanate ester resin content is less than or equal to 35 volume percent based on the total weight of the composition when the reinforcing fibers comprise 50 volume percent.

17. The composition of claim 6 further comprising at least one additive selected from the group consisting of curing agents, cure accelerators, catalysts, crosslinking agents, dyes, flame retardants, pigments, impact modifiers, and flow control agents.

18. The composition of claim 6 wherein the composition comprises no greater than 100 parts per million by weight alkali metal and alkaline earth metal ions based on the total weight of the silica nanoparticles and curable polycyanate ester resin.

* * * * *